United States Patent
Aizono

(10) Patent No.: US 10,530,954 B2
(45) Date of Patent: Jan. 7, 2020

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Keisuke Aizono, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/234,158

(22) Filed: Dec. 27, 2018

(65) Prior Publication Data

US 2019/0132466 A1 May 2, 2019

Related U.S. Application Data

(63) Continuation of application No. 13/902,690, filed on May 24, 2013, now Pat. No. 10,205,841.

(30) Foreign Application Priority Data

May 30, 2012 (JP) ................................ 2012-122905

(51) Int. Cl.
*H04N 1/00* (2006.01)
*G06F 1/28* (2006.01)

(52) U.S. Cl.
CPC ........... *H04N 1/00904* (2013.01); *G06F 1/28* (2013.01); *H04N 1/00896* (2013.01); *H04N 1/00928* (2013.01); *H04N 2201/0082* (2013.01); *H04N 2201/0091* (2013.01)

(58) Field of Classification Search
CPC ........... H04N 1/00904; H04N 1/00928; H04N 1/00896; H04N 2201/0082; H04N 2201/0091; G06F 1/28
See application file for complete search history.

(56) References Cited

U.S. PATENT DOCUMENTS

2004/0215953 A1* 10/2004 Cantwell ............... G06F 9/4418
713/2
2006/0004978 A1* 1/2006 Nakayama ............ G06F 9/4411
711/170

* cited by examiner

*Primary Examiner* — Francisco A Grullon
(74) *Attorney, Agent, or Firm* — Canon U.S.A., Inc. IP Division

(57) ABSTRACT

The present invention relates to an information processing apparatus having a plurality of storage units, capable of staring in any of a plurality of activation modes including a first activation mode and a second activation mode operable with a faster activation time than the first activation mode.

15 Claims, 7 Drawing Sheets

FIG. 2

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | CHECKSUM 0 | | | | | DATA 01 | | | | DATA 02 | | | | DATA 03 | | |
| 0x0010 | CHECKSUM 1 | | | | | DATA 11 | | | | DATA 12 | | | | DATA 13 | | |
| 0x0020 | CHECKSUM 2 | | | | | DATA 21 | | | | DATA 22 | | | | DATA 23 | | |
| 0x0030 | CHECKSUM 3 | | | | | DATA 31 | | | | DATA 32 | | | | DATA 33 | | |
| 0x0040 | CHECKSUM 4 | | | | | DATA 41 | | | | DATA 42 | | | | DATA 43 | | |
| 0x0050 | CHECKSUM 5 | | | | | DATA 51 | | | | DATA 52 | | | | DATA 53 | | |
| ... | ... | | | | | ... | | | | ... | | | | ... | | |

FIG. 3

| PATTERN | VALUE OF NVMEM-A | VALUE OF NVMEM-B | VALUE OF NVMEM-C | CHECKING RESULT |
|---|---|---|---|---|
| PATTERN 1 | A | A | A | NORMAL ACTIVATION |
| PATTERN 2 | A | B | A | RESTORE NVMEM-B WITH VALUE "A" |
| PATTERN 3 | A | B | B | RESTORE NVMEM-A WITH VALUE "B" |
| PATTERN 4 | A | B | C | ERROR |
| PATTERN 5 | A | A | — | RESTORE NVMEM-C WITH VALUE "A" |
| PATTERN 6 | A | B | — | ERROR |
| PATTERN 7 | A | — | — | RESTORE NVMEM-B/C WITH VALUE "A" |
| PATTERN 8 | — | — | — | ERROR |

INFORMATION PROCESSING APPARATUS, CONTROL METHOD OF INFORMATION PROCESSING APPARATUS, AND STORAGE MEDIUM

This application is a Continuation of U.S. application Ser. No. 13/902,690, filed May 24, 2013, which claims priority from Japanese Patent Application No. 2012-122905, filed May 30, 2012. These applications are hereby incorporated by reference herein in their entireties.

BACKGROUND OF THE INVENTION

Field of the Invention

The present invention relates to an information processing apparatus, a control method of the information processing apparatus, and a storage medium.

Description of the Related Art

In recent years, due to multi-functionalization of the information processing apparatus, time required for a user to make the information processing apparatus operational after turning on a power has become longer. As one solution to the above situation, there is provided a technique known as "suspend" described in Japanese Patent Application Laid-Open No. 2007-293806. Specifically, when the user turns off the power switch, instead of shutting down the power, the power is continuously supplied to a random access memory (RAM) to hold data while the power supply to other devices is suspended (suspend). Then, when the user turns on the power switch next time, instead of performing boot processing, the power supply to the other devices that has been suspended is restarted to return promptly to an operating state by using the data stored in the RAM (resume). With this configuration, while it seems to the user that the power has been turned off, in practice, the information processing apparatus can be activated at higher speed than usual. On the other hand, the information processing apparatus includes data which may cause a problem in terms of apparatus performance and operation if the data is lost. For example, the information relating to security or charging, which requires data reliability, can be such data. In order to protect such data, there is provided a technique in which, by executing multi-backup (mutual backup) using a plurality of memories, the data can be restored from other memory even if one of the memories is broken. In the technique, at the time of boot processing, all of multi-backup regions are checked, and matching of data among a plurality of memories is confirmed.

However, if the suspend function is employed with respect to the information processing apparatus which performs the multi-backup using a plurality of memories, the following problems may occur. In the suspend function, because the boot processing will not be executed in a resuming period, naturally, the matching confirmation of data among a plurality of memories, which is supposed to be executed in the boot processing, will not be executed. Therefore, for example, in a case where the user replaces a memory in a suspended state, a state in which the data among a plurality of memories are mismatched may continue thereafter.

In order to avoid the above situation, checking the matching of data among a plurality of memories is conceivable even in the resuming period. However, this takes longer time for the information processing apparatus to return from the suspended state, and thus the effect of employing the resume function may deteriorate.

SUMMARY OF THE INVENTION

The present invention is directed to provide a technique for detecting the mismatching of data among a plurality of memories caused by replacing a memory in a suspended state, when a suspend function is employed with respect to an information processing apparatus which performs multi-backup using a plurality of memories.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a table illustrating an example of data matching in a nonvolatile memory (NVMEM).

FIG. 3 is a table illustrating a data matching check pattern in the NVMEM.

FIG. 4 is a flowchart illustrating an operation of the image forming apparatus when a power switch is ON.

DESCRIPTION OF THE EMBODIMENTS

Various exemplary embodiments, features, and aspects of the invention will be described in detail below with reference to the drawings.

In the following descriptions, an image forming apparatus such as a printer will be described. However, the present invention can be applied to a general information processing apparatus such as a personal computer (PC).

Figure 1:
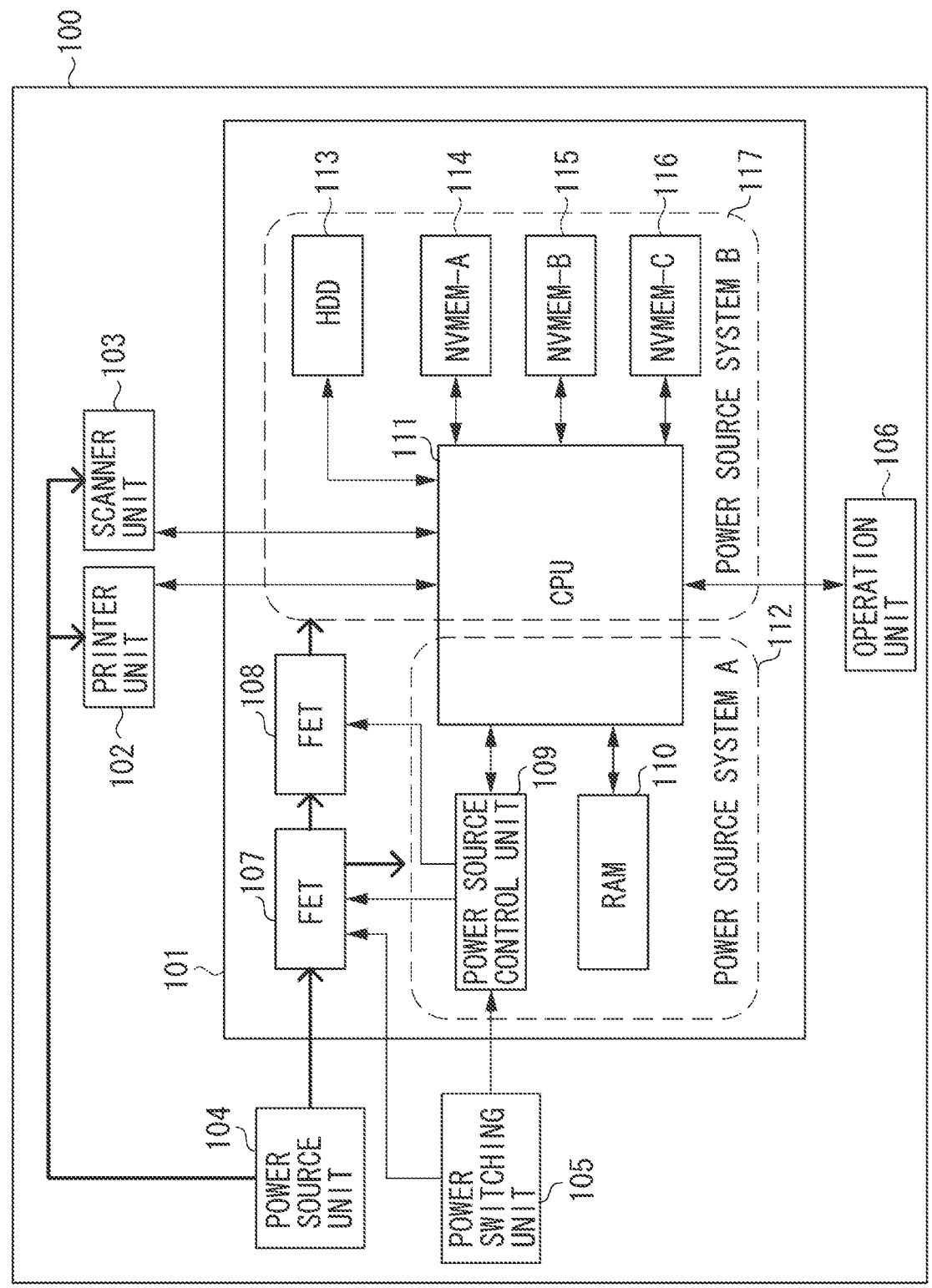
FIG. 1 is a block diagram illustrating a configuration of an image forming apparatus.

FIG. 1 is a block diagram illustrating a configuration of an image forming apparatus according to a first exemplary embodiment.

An image forming apparatus 100 is configured of a controller unit 101, a printer unit 102, a scanner unit 103, a power source unit 104, a power switching unit 105, and an operation unit 106.

The controller unit 101 is connected to the printer unit 102 and the scanner unit 103 via a device control interface (I/F), and performs general control of the image forming apparatus 100. The configurations thereof will be described below in detail.

The printer unit 102 prints image data transmitted from the controller unit 101 on a printing paper.

The scanner unit 103 receives a scanning instruction from the controller unit 101, performs a scanning operation, and transmits scanned image data to the controller unit 101.

The power source unit 104 supplies electric power to the controller unit 101, the printer unit 102, and the scanner unit 103.

The power switching unit 105 monitors a transition factor of an electric power state. A user turns the power switching unit 105 ON and OFF to instruct ON/OFF of the electric power, or transition/return of the suspend mode.

The operation unit 106 includes a light emitting diode (LED), a liquid crystal display, and an operation button, and accepts an operation from the user to display content of the operation and an internal state of the apparatus. The electric power for the operation unit 106 is supplied via the controller unit 101.

The controller unit 101 is configured of a field-effect transistor (FET) 107 (semiconductor switch), an FET 108 (semiconductor switch), a power source control unit 109, a random access memory (RAM) 110, a central processing unit (CPU) 111, a power source system A 112, and a hard disk drive (HDD) 113. Further, the controller unit 101 is configured of a nonvolatile memory-A 114 (NVMEM-A 114), a nonvolatile memory-B 115 (NVMEM-B 115), and a nonvolatile memory-C 116 (NVMEM-C 116).

The FET 107 receives electric power from the power source unit 104, and supplies or shuts off the electric power for the power source system A 112 and the FET 108 according to an instruction from the power switching unit 105 or the power source control unit 109.

The FET 108 receives electric power from the FET 107, and supplies or shuts off the electric power for the power source system B 117 according to an instruction from the power source control unit 109.

The power source control unit 109 receives an instruction from the power switching unit 105 or the CPU 111, and instructs the FET 107 and the FET 108 to supply or shut off the electric power. Further, the power source control unit 109 notifies the CPU 111 of information necessary to manage the power source, such as the operational state of the power switching unit 105.

The RAM 110 is a volatile storage medium for temporarily storing a program and image data used by the CPU 111.

The CPU 111 serves as an execution medium of controller firmware built into the HDD 113, and controls operations of devices connected to the controller unit 101 via each of the memory and the I/F.

The power source system A 112 includes the power source control unit 109, the RAM 110, and a part of the CPU 111. In order to manage the power source for the image forming apparatus 100, the electric power is continuously supplied to the power source system A 112 even in a suspended state.

The HDD 113 is a storage medium such as a magnetic disk, and stores controller firmware and image data.

The NVMEM-A 114, the NVMEM-B 115, and the NVMEM-C 116 are nonvolatile storage media for storing data which particularly needs to be reliable among the data necessary for the operations and display of the image forming apparatus 100. As for the data which requires multi-backup, the same content thereof is stored in each of the NVMEM-A 114, the NVMEM-B 115, and the NVMEM-C 116. By executing the multi-backup, the data can be restored from other NVMEM even if a part of the NVMEMs is broken or replaced. The NVMEM-A 114, the NVMEM-B 115, and the NVMEM-C 116 can be different from each other in terms of the memory size or the memory element.

The power source system B 117 includes the CPU 111, the HDD 113, the NVMEM-A 114, the NVMEM-B 115, and the NVMEM-C 116. The electric power for the power source system B 117 is shut off in a suspended state.

Now, the electric power states of the image forming apparatus 100, and the activation modes by which the image forming apparatus 100 can be activated will be described.

The electric power states of the image forming apparatus 100 includes a power ON state, a power saving state, and a power OFF state. In the power ON state, with respect to the devices configuring the image forming apparatus 100, electric power is supplied to all of the devices including the printer unit 102, the scanner unit 103, the operation unit 106, the power source system A 112, and the power source system B 117. In the power saving state, from among the devices of the image forming apparatus 100, the electric power is supplied to the power source system A 112, while the electric power is not supplied to other devices including the printer unit 102, the scanner unit 103, the operation unit 106, and the power source system B 117. In the power OFF state of the image forming apparatus 100, the electric power is not supplied to any of the devices including the printer unit 102, the scanner unit 103, the operation unit 106, the power source system A 112, and the power source system B 117. When the above electric power states are arranged in a descending order of power consumption, the electric power states can be arranged in the order of the power ON state> the power saving state> the power OFF state.

The activation modes for the image forming apparatus 100 includes a normal activation mode (first activation mode), and a high-speed activation mode (second activation mode). In the normal activation mode, the power switch is turned ON in the power OFF state to execute boot processing and shift to the power ON state. In the high-speed activation mode, the power switch is turned ON in the power saving state and shift to the power ON state without executing boot processing. When the above activation modes are arranged in the descending order of activation time, the activation modes can be arranged in the order of the high-speed activation mode> the normal activation mode.

FIG. 2 is a diagram illustrating an example of data alignment in the NVMEM. With the structure thereof, matching check of the data within the memory can be executed.

In FIG. 2, the data is held in a unit of four bytes, a block is divided in a unit of 16 bytes, and each of the blocks stores a checksum. Specifically, the blocks are divided in such a manner that 0x0000 through 0x000F as a first block, 0x0010 through 0x001F as a second block, and 0x0020 through 0x002F as a third block.

The first block is configured of a checksum 0, a data 01, a data 02, and a data 03. The checksum 0 is acquired by adding 0x0004 through 0x000F in terms of byte, and adding 1 lastly. The checksum is recalculated and written when any of the data 01, the data 02, or the data 03 is written. Through this processing, it is possible to check in terms of memories whether respective values of the data 01, the data 02, and the data 03 are damaged. The second block and the subsequent blocks have the same format.

FIG. 3 is a table illustrating a data matching check pattern in the NVMEM. The matching of data among a plurality of memories can be checked through a method illustrated there.

A pattern 1 indicates a state where values of all the NVMEMs are matched as "A". Therefore, it is not necessary to execute restoration processing, so that the image processing apparatus 100 is activated in a normal state.

In a pattern 2, only the NVMEM-B has a different value "B". Therefore, by a majority decision of each memory, the value of the NVMEM-B is restored to "A", and the image processing apparatus 100 is activated in a normal state.

In a pattern 3, only the NVMEM-A has a different value "A". Therefore, by a majority decision of each memory, the value of the NVMEM-A is restored to "B", and the image processing apparatus 100 is activated in a normal state.

In a pattern 4, values of all the NVMEMs are different. Because a restoration source cannot be determined by a majority decision of each memory, an error is displayed on the operation unit 106.

A pattern 5 indicates a state where a value of the NVMEM-C cannot be specified due to a checksum error (in the table, indicated as "–"). In this case, because the NVMEM-A and the NVMEM-B have the same value "A", the value of the NVMEM-C is restored to "A", and the image processing apparatus 100 is activated in a normal state.

In a pattern 6, a value of the NVMEM-C is a checksum error while the NVMEM-A and the NVMEM-B have different values. Therefore, the restoration source cannot be specified, and the error is displayed on the operation unit 106.

In a pattern 7, only the NVMEM-A has a normal value. Therefore, the values of the NVMEM-B and the NVMEM-C C are restored to "A", and the image processing apparatus 100 is activated in a normal state.

In a pattern 8, because values of all the NVMEMs are checksum errors, an error is displayed on the operation unit 106.

These patterns indicate representative examples, and as long as the matching check method and the restoration method are determined in advance, a method other than the above-described method may be employed. For example, in the present exemplary embodiment, a restoration method by a simple majority decision is employed as an example. However, a weighting according to the reliability of each NVMEM as hardware may be employed.

Further, in the present exemplary embodiment, three pieces of NVMEMs are employed. However, as long as a plurality of NVMEMs is employed, any number of the NVMEMs may be used instead of three pieces.

Figure 4:
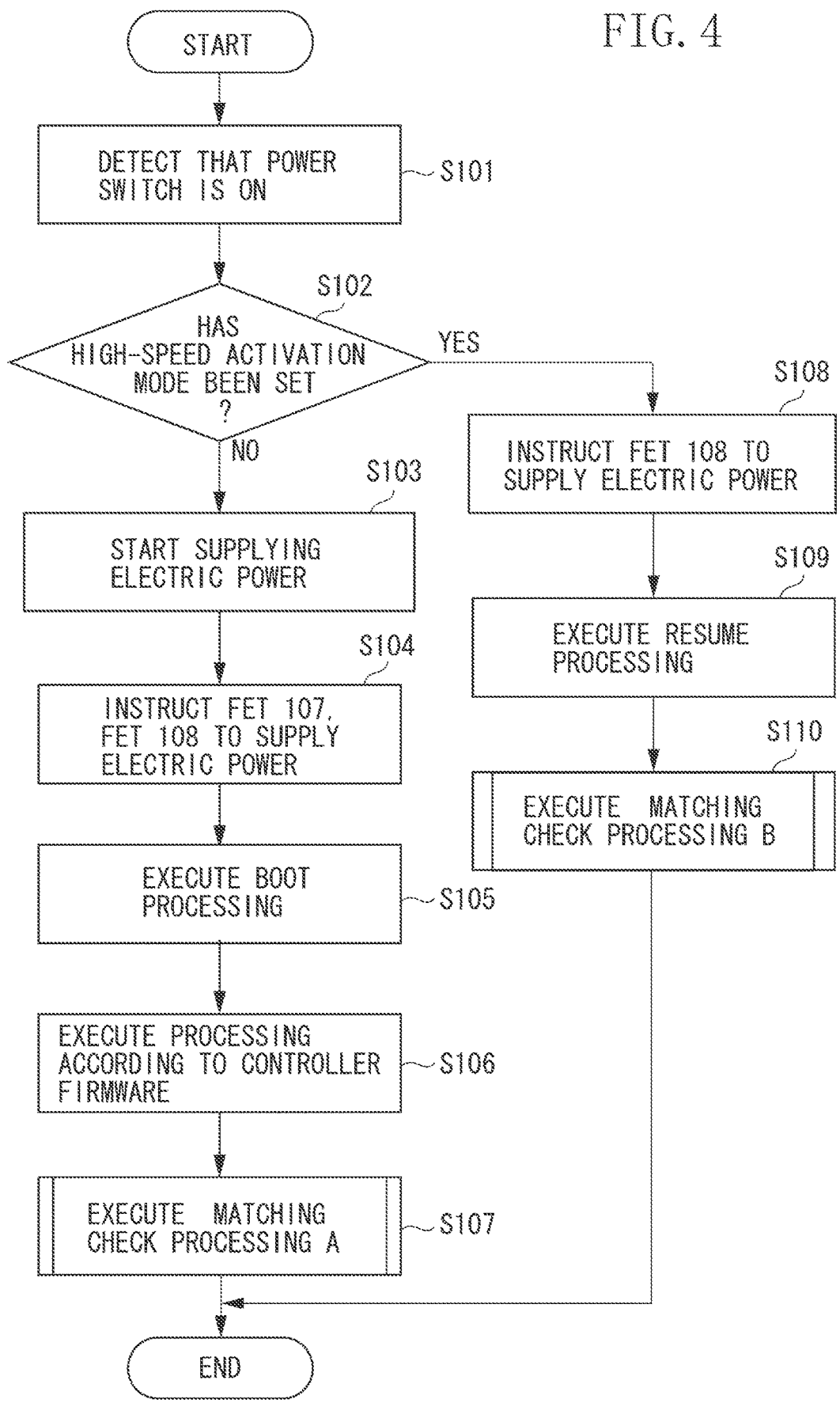

FIG. 4 is a flowchart illustrating an operation of the image forming apparatus 100 when the power switch is ON. The program stored in the HDD 113 is read out to the RAM 110 and executed by the CPU 111 to realize the processing in FIG. 4. In a case where the image forming apparatus 100 is activated in the high-speed activation mode, the processing for reading the program from the RAM 110 to the HDD 113 is omitted because the program has already been stored in the RAM 110.

In step S101, the power switching unit 105 detects that the power is ON.

In step S102, if the current activation mode is a normal activation mode (NO in step S102), the processing proceeds to step S103. If the current activation mode is a high-speed activation mode (YES in step S102), the processing proceeds to step S108. The normal activation mode is an activation method for activating the image forming apparatus 100 by executing boot processing from the power OFF state where the electric power is not supplied to both the power source system A 112 and the power source system B 117. The normal activation mode corresponds to the processing in steps S103 through S106. On the other hand, the high-speed activation mode is an activation method for activating the image forming apparatus 100 by executing resume processing in the suspended state where the electric power is supplied to the power source system A 112 while no electric power is supplied to the power source system B 117. The high-speed activation mode corresponds to the processing in steps S108 and S109. In other words, in step S102, if the power is turned ON in the power OFF state, the processing proceeds to step S103, and the processing proceeds to step S108 if the power is turned ON in the suspended state.

In step S103, upon receipt of an instruction from the power switching unit 105, the FET 107 supplies the electric power supplied from the power source unit 104 to the power source system A 112 and the FET 108.

In step S104, the power source control unit 109 is activated by receiving the electric power from the FET 107, so as to instruct the FET 107 and the FET 108 to supply electric power. The FET 107 has already been instructed from the power switching unit 105 to supply electric power. However, the instruction for supplying the electric power is also provided from the power source control unit 109. Consequently, even if the FET 107 receives an instruction for shutting off the electric power from the power switching unit 105, the electric power supplied from the FET 107 will not be shut off. Therefore, an instruction for shutting off the electric power has to be also provided from the power source control unit 109. This enables the CPU 111 to execute electric power management. Further, by receiving an instruction for supplying the electric power from the power source control unit 109, the FET 108 supplies electric power to the power source system B 117.

In step S105, the CPU 111 executes boot processing including RAM checking processing.

In step S106, the CPU 111 reads controller firmware stored in the HDD 113 into the RAM 110, executes processing according to the expanded program, and activates the entire system.

In step S107, the CPU 111 executes matching check processing A with respect to a plurality of the NVMEMs. The matching check processing A will be described below in detail with reference to FIG. 5.

In step S108, via the power source control unit 109, the CPU 111 instructs the FET 108 to supply electric power. The FET 108 receives the instruction and supplies electric power to the power source system B 117.

In step S109, the CPU 111 executes resume processing of the suspended controller firmware, and activates the entire system.

In step S107, the CPU 111 executes the matching check processing B with respect to a plurality of NVMEMs. The matching check processing B will be described below in detail with reference to FIG. 6.

Figure 5:
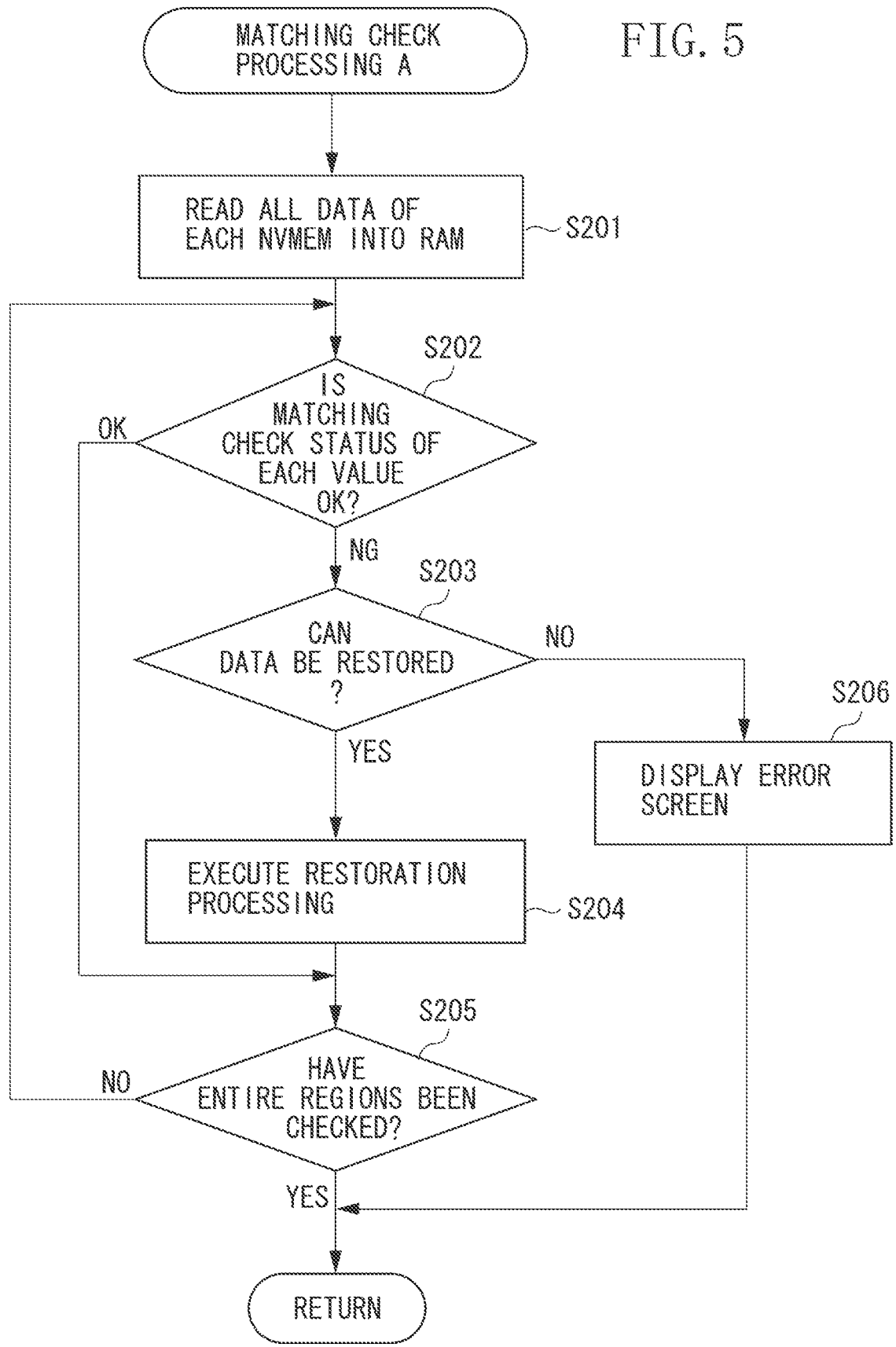
FIG. 5 is a flowchart illustrating details of matching check processing A.

FIG. 5 is a flowchart illustrating details of the matching check processing A. The matching check processing A is a matching check processing method executed with respect to a plurality of NVMEMs when the image forming apparatus 100 is activated in the normal activation mode. The program stored in the HDD 113 is read out to the RAM 110 and executed by the CPU 111 to realize the processing in FIG. 5.

In step S201, the CPU 111 reads out all the data in the NVMEMs and stores in the RAM 110. At this time, the data read out from the NVMEMs also includes representative data (predetermined data). The representative data may be the individual information such as a serial number, which is not changed from the previous activation time until the current activation time. For example, the representative data is stored in the data 01 of each NVMEM in FIG. 2.

In step S202, the CPU 111 checks data values among the NVMEMs one-by-one. The checking method has already been described with reference to FIG. 3. If the checking status is "OK" (YES in step S202), the processing proceeds to step S205. If the checking status is "not OK (NG)" (NO in step S202), the processing proceeds to step S203.

In step S203, the CPU 111 determines whether restoration of mismatched data is possible. If the CPU 111 determines that the restoration thereof is possible (YES in step S203), the processing proceeds to step S204. If the CPU 111 determines that the restoration thereof is not possible (NO in step S203), the processing proceeds to step S206.

In step S204, the CPU 111 executes restoration processing of data by a restoration method corresponding to the matching pattern checked in step S202. Corresponding relationship between the matching pattern and the restoration method has already been described with reference to FIG. 3.

In step S205, the CPU 111 determines whether data checking of the entire regions has been completed. When the processing of step S205 is completed normally, the CPU 111 stores the representative data of each NVMEM in the RAM 110. If the CPU 111 determines that the data checking has been completed (YES in step S205), the processing returns to a main flowchart to make the image processing apparatus 100 operational. If the CPU 111 determines that the data checking has not been completed (NO in step S205), the processing proceeds to step S202.

In step S206, the CPU 111 causes the operation unit 106 to display an error.

Figure 6:
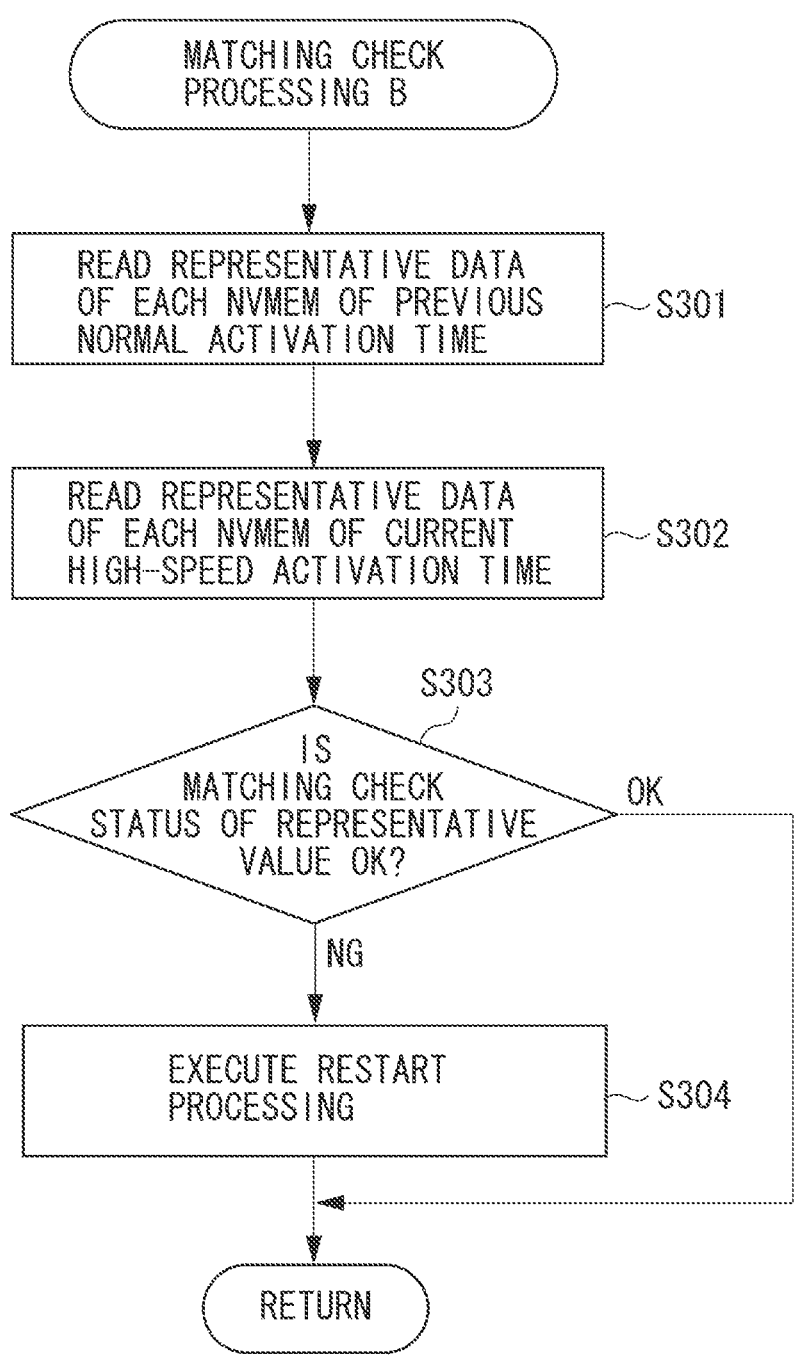
FIG. 6 is a flowchart illustrating details of matching check processing B.

FIG. 6 is a flowchart illustrating details of the matching check processing B. The matching check processing B is a matching check processing method executed with respect to a plurality of NVMEMs when the image forming apparatus 100 is activated in the high-speed activation mode. The program stored in the HDD 113 is read out to the RAM 110 and executed by the CPU 111 to realize the processing in FIG. 6.

In step S301, the CPU 111 accesses the matching-checked data of each NVMEM stored in the RAM 110, and reads out the representative data of each NVMEM at the previous normal activation time (first read out).

In step S302, the CPU 111 accesses the representative data of each NVMEM that is currently connected thereto, and reads out the representative data of each NVMEM at the current high-speed activation time (second read out).

In step S303, with respect to each NVMEM, the CPU 111 executes matching check of each NVMEM at high-speed only by using the representative data. Specifically, with respect to each NVMEM, the CPU 111 compares the representative data of the NVMEM at the previous normal activation time that is read out in step S301, with the representative data of the NVMEM at the current high-speed activation time that is read out in step S302, and checks whether the representative data conforms to each other. If the checking status is "OK" (YES in step S303), the processing returns to the main flowchart to make the image processing apparatus 100 operational. If the checking status is "not OK (NG)" (NO in step S303), the processing proceeds to step S304.

In step S304, the CPU 111 executes restart processing. The restart processing includes the activation processing in the normal activation mode described in steps S103 through S106, and the matching check processing A described in step S107.

Figure 7:
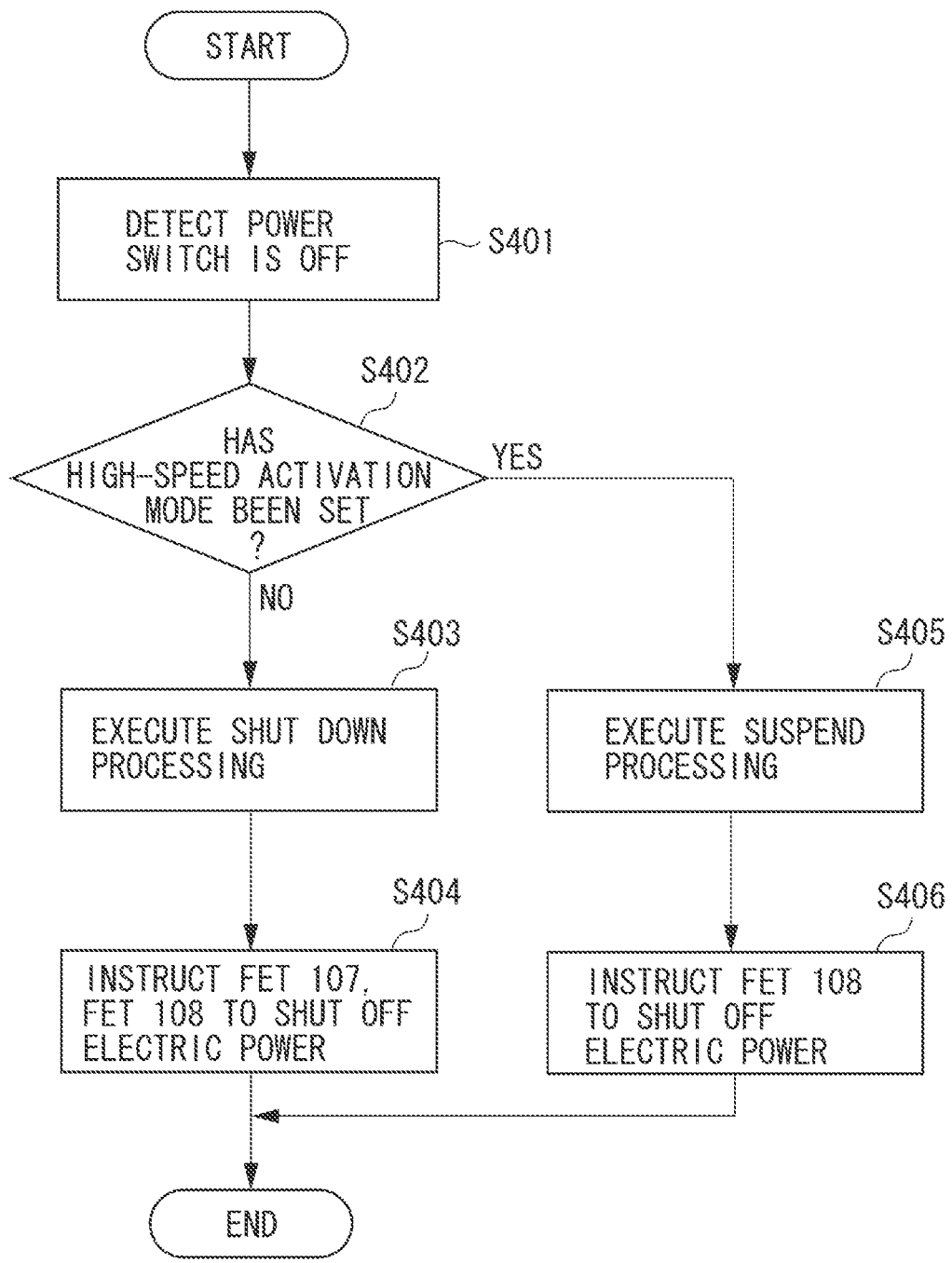
FIG. 7 is a flowchart illustrating an operation of the image forming apparatus when a power switch is OFF.

FIG. 7 is a flowchart illustrating an operation of the image forming apparatus 100 when the power switch is OFF. The program stored in the HDD 113 is read out to the RAM 110 and executed by the CPU 111 to realize the processing in FIG. 7.

In step S401, via the power source control unit 109, the CPU 111 detects that the power switching unit 105 is OFF.

In step S402, the CPU 111 reads the activation mode stored in the NVMEM-A 114, and determines whether the high-speed activation mode is set. If the CPU 111 determines that the high-speed activation mode is set (YES in step S402), the processing proceeds to step S405. If the CPU 111 determines that the high-speed activation mode is not set (NO in step S402), the processing proceeds to step S403.

In step S403, the CPU 111 executes shut down processing of the image forming apparatus 100.

In step S404, via the power source control unit 109, the CPU 111 instructs the FET 107 and the FET 108 to shut off the electric power. Through this processing, power supply to the power source system A 112 and the power source system B 117 is shut off, so that the image forming apparatus 100 enters into a power OFF state.

In step S405, the CPU 111 executes suspend processing of the image forming apparatus 100.

In step S406, via the power source control unit 109, the CPU 111 instructs the FET 108 to shut off the electric power. Through this processing, power supply to the power source system B 117 is shut off while power supply to the power source system A 112 is continued, and thus the image forming apparatus 100 enters into a suspended state.

According to the present exemplary embodiment, when the image processing apparatus is activated in a high-speed activation mode, with respect to each memory, matching check of data is executed by comparing the representative data at the previous normal activation time, with the representative data at the current high-speed activation time. Through this processing, in a case where the suspend function is applied to the information processing apparatus which performs multi-backup using a plurality of memories, it is possible to detect the mismatching of data among a plurality of memories caused by replacing a memory in a suspended state.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
a power switch;
first and second nonvolatile memories, each of which stores at least first-type data which is read out in both of a first checking process and a second checking process and second-type data which is read out in the first checking process but is not read out in the second checking process;
a controller which executes a first activation process if the information processing apparatus starts in a first activation mode based on the power switch, and executes a second activation process if the information processing apparatus starts in a second activation mode whose activation time is shorter than the first activation mode, wherein the controller is further configured to:
(A) execute, if the information processing apparatus starts in the first activation mode based on the power switch, the first checking process after executing the first activation process,
wherein the first checking process includes
(a1) reading out the first-type data and second-type data from each of the first and second nonvolatile memories,
(a2) determining whether the first-type data stored in the first nonvolatile memory and the first-type data stored in the second nonvolatile memory are the same based on the first-type data read out from the first nonvolatile memory and the first-type data read out from the second nonvolatile memory, and
(a3) determining whether the second-type data stored in the first nonvolatile memory and the second-type data stored in the second nonvolatile memory are the same based on the second-type data read out from the first nonvolatile memory and the second-type data read out from the second nonvolatile memory, and
(B) execute, if the information processing apparatus starts in the second activation mode based on the power switch, the second checking process after executing the second activation process,
wherein the second checking process includes
(b1) reading out the first-type data from each of the first and second nonvolatile memories, and
(b2) determining whether the first-type data stored in the first nonvolatile memory and the first-type data stored in the second nonvolatile memory are the same based on the first-type data read out from the first nonvolatile memory and the first-type data read out from the second nonvolatile memory, but
wherein the second checking process does not include
(c1) reading out the second-type data, which is read out in the first checking process, from each of the first and second nonvolatile memories, and
(c2) determining whether the second-type data stored in the first nonvolatile memory and the second-type data stored in the second nonvolatile memory are the same.

2. The information processing apparatus according to claim 1,
wherein the controller is configured to:
perform, in the first checking process, comparison using the first-type data and second-type data read out from the first nonvolatile memory and the first-type data and second-type data read out from the second nonvolatile memory, and
perform, in the second checking process, comparison using the first-type data read out from the first nonvolatile memory and the first-type data read out from the second nonvolatile memory.

3. The information processing apparatus according to claim 1, wherein
the second checking process does not read out the second-type data from each of the first and second nonvolatile memories and does not compare the second-type data read out from the first nonvolatile memory to the second-type data read out from the second nonvolatile memory.

4. The information processing apparatus according to claim 1,
wherein the controller includes a volatile memory, the first activation process executed by the controller is a boot process including checking the volatile memory to which power is supplied, and the second activation process executed by the controller is a resume process using data previously stored in the volatile memory, and
wherein the controller executes the first checking process after the boot process, and executes the second checking process after executing the resume process.

5. The information processing apparatus according to claim 1,
wherein, if the second checking process determines that the first-type data read out from the first nonvolatile memory and the first-type data read out from the second nonvolatile memory are not the same, the controller restores one of the second-type data stored in the first nonvolatile memory and the second-type data stored in the second nonvolatile memory.

6. An information processing apparatus which is activated based on an on operation to a power switch of the information processing apparatus, comprising:
first and second nonvolatile memories, each of which is configured to store at least first data and second data, wherein the first data is read out by both of a first checking process executed when the information processing apparatus is activated in a first activation mode and a second checking process executed when the information processing apparatus is activated in a second activation mode whose activation time is shorter than the first activation mode, and the second data is read out by the first checking process but is not read out by the second checking process; and
a controller configured to:
execute the first checking process of reading out both the first data and the second data from each of the first and the second nonvolatile memories and determining whether or not the first and second data read out from the first nonvolatile memory and the first and second data read out from the second nonvolatile memory are the same, if the information processing apparatus is activated in the first activation mode, and
execute the second checking process of reading out the first data from each of the first and the second nonvolatile memories, determining whether or not the first data read out from the first nonvolatile memory and the first data read out from the second nonvolatile memory are the same, if the information processing apparatus is activated in the second activation mode.

7. The information processing apparatus according to claim 6, wherein the second checking process does not read out the second data from each of the first and second nonvolatile memories and does not determine whether or not the second data stored in the first nonvolatile memory and the second data stored in the second nonvolatile memory are the same.

8. The information processing apparatus according to claim 6, wherein the controller determines, when the information processing apparatus is activated based on an on operation to the power switch, whether an activation mode is a first activation mode or a second activation mode.

9. The information processing apparatus according to claim 6, wherein
the first and second data stored in each of the first and second nonvolatile memories are a serial number and charging information, respectively,
the first checking process reads out both the serial number and charging information from each of the first and second nonvolatile memories and determines whether or not the serial number and charging information read out from the first nonvolatile memory and the serial number and charging information read out from the second nonvolatile memory are the same, and
the second checking process reads out the serial number but does not read out the charging information from the each of the first and second nonvolatile memories and determines whether or not the serial number read out from the first nonvolatile memory and the serial number read out from the second nonvolatile memory are the same but does not determines whether or not the charging information stored in the first nonvolatile memory and the charging information stored in the second nonvolatile memory are the same.

10. The information processing apparatus according to claim 6,
wherein the controller includes a volatile memory,
wherein the controller executes a boot process including checking the volatile memory which is powered is-on based on the on operation to the power switch, if the information processing apparatus is activated in the first activation mode, and executes a resume process using data that was stored in the volatile memory before the on operation to the power switch, if the information processing apparatus is activated in the second activation mode, and
wherein the controller executes the first checking process after executing the boot process, and executes the second checking process after executing the resume process.

11. The information processing apparatus according to claim 6,
wherein, based on the second checking process determining that the first data read out from the first nonvolatile memory and the first data read out from the second nonvolatile memory are not the same, the controller restores one of the first data stored in the first nonvolatile memory and the first data stored in the second nonvolatile memory.

12. An information processing apparatus comprising:
a power switch operable by a user to activate the information processing apparatus;
first and second nonvolatile memories for storing the same set of data including first data and second data, the first data being read out when the information processing apparatus is activated in a first activation mode and when the information processing apparatus is activated in a second activation mode whose activation time is shorter than the first activation mode, and the second data being read out when the information processing apparatus is activated in the first activation mode but not read out when the information processing apparatus is activated in the second activation mode; and
a controller configured to:
determine, when the information processing apparatus is activated based on an operation to the power switch, whether the information processing apparatus is activated in the first activation mode or the second activation mode;
if it has been determined that the information processing apparatus is activated in the first activation mode, read all the set of data from each of the first and second nonvolatile memories and determines whether the set of data read from the first nonvolatile memory and the set of data read from the second nonvolatile memory are the same; and
if it has been determined that the information processing apparatus is activated in the second activation mode, read only a part of the set of data including at least the first data but not including the second data from each of the first and second nonvolatile memories and determines whether the part of the set of data read from the first nonvolatile memory and the part of the set of data read from the second nonvolatile memory are the same.

13. The information processing apparatus according to claim 12, wherein the controller compares the part of the set of data read from the first nonvolatile memory to data prestored in the controller and compares the part of the set of data read from the second nonvolatile memory to the data prestored in the controller to determine whether the part of the set of data read from the first nonvolatile memory and the part of the set of data read from the second nonvolatile memory are the same.

14. The information processing apparatus according to claim 13, wherein the controller includes a volatile memory, and the data prestored in the controller and used in the second activation mode is stored in the volatile memory when the information processing apparatus is activated in the first activation mode.

15. The information processing apparatus according to claim 12,
wherein, when the information processing apparatus is activated based on an operation to the power switch, the controller executes a boot process if it has been determined that the information processing apparatus is activated in the first activation mode, and executes a resume process if it has been determined that the information processing apparatus is activated in the second activation mode.

* * * * *